Feb. 20, 1962  R. D. ALLEN  3,022,086
CARGO-CARRYING APPARATUS WITH DETACHABLE
WHEELED SUPPORT MEANS
Filed April 28, 1959  2 Sheets-Sheet 1
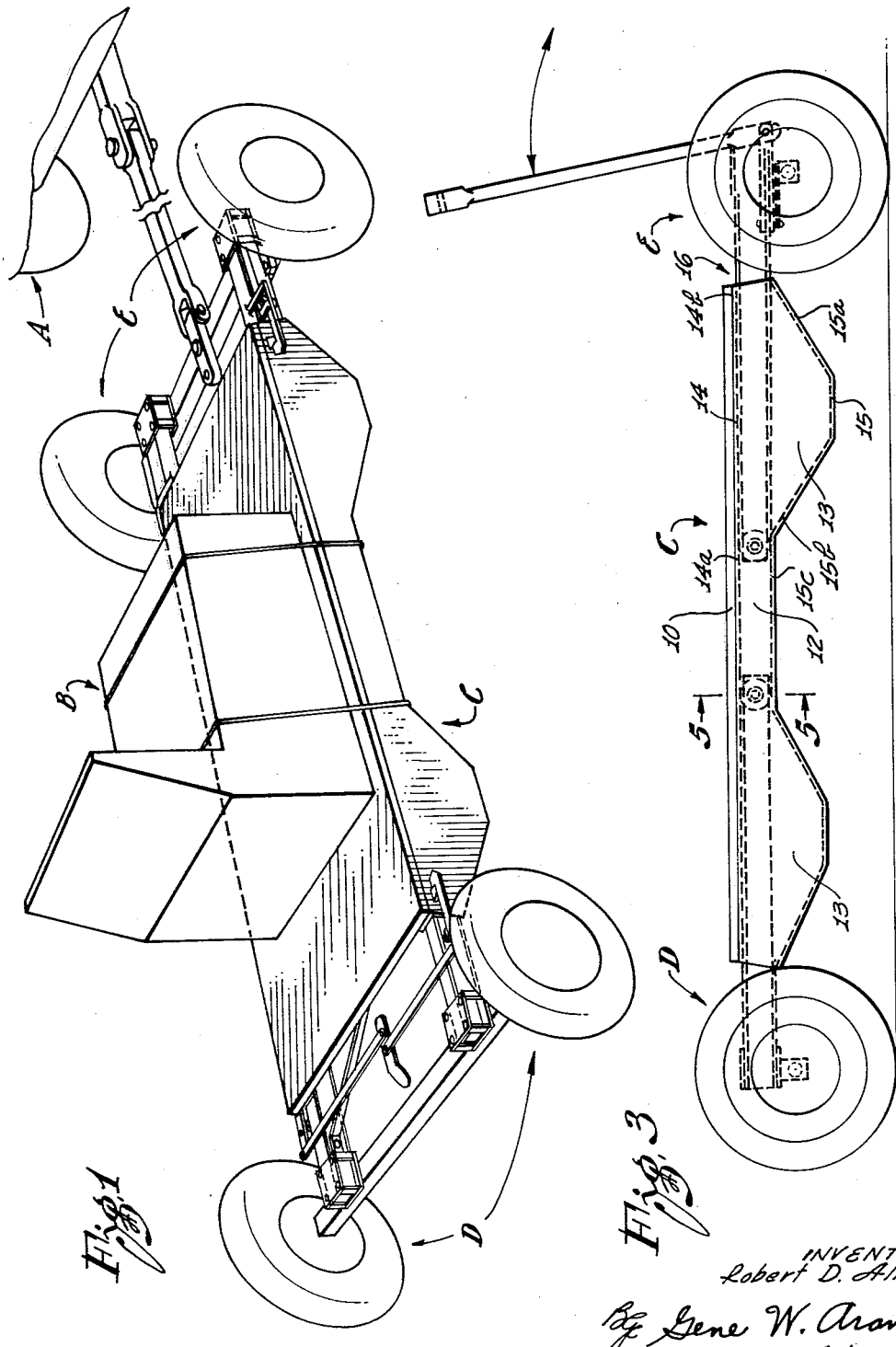
INVENTOR:
Robert D. Allen
By Gene W. Arant
Attorney

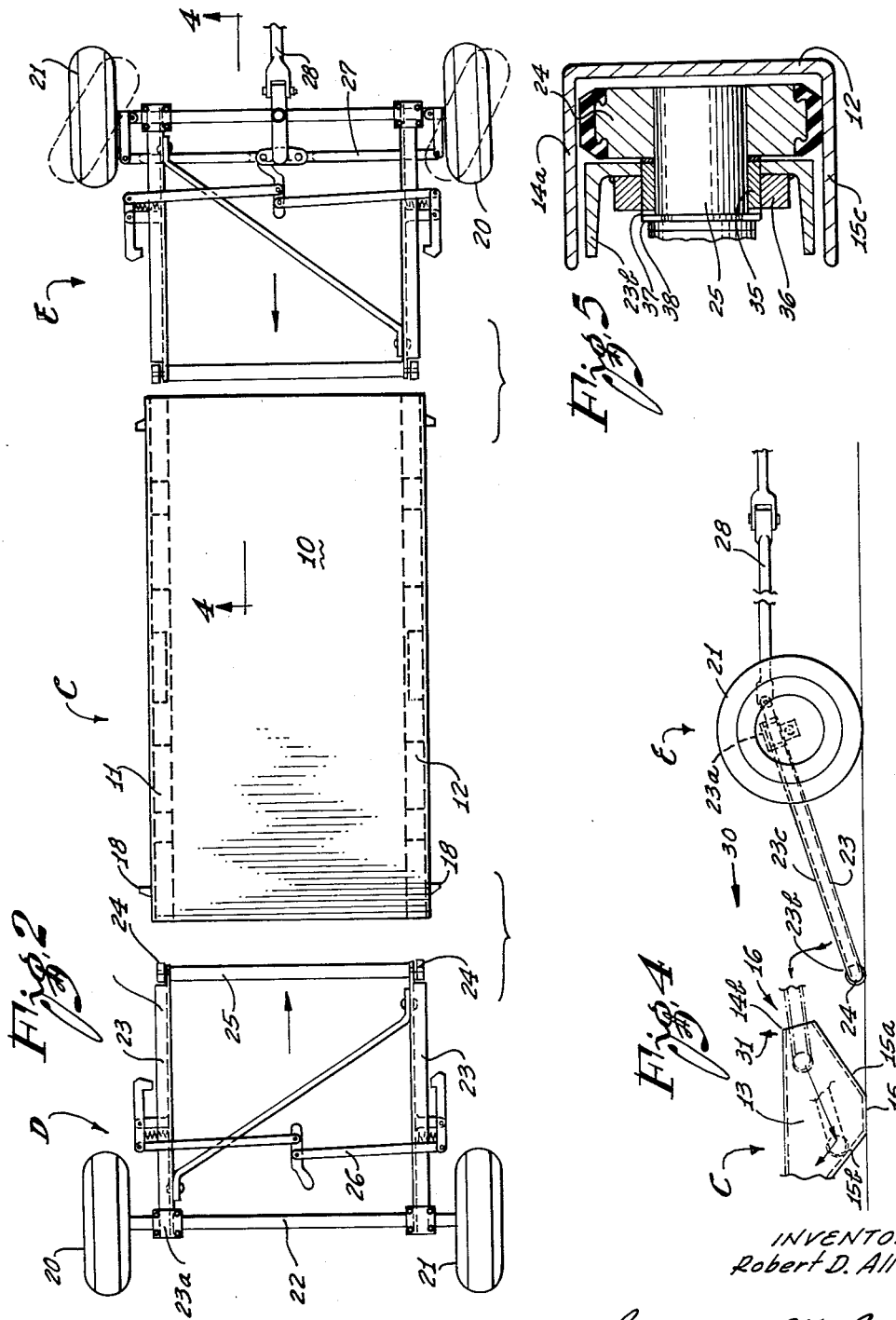

United States Patent Office 3,022,086
Patented Feb. 20, 1962

3,022,086
CARGO-CARRYING APPARATUS WITH DETACH-ABLE WHEELED SUPPORT MEANS
Robert D. Allen, Bellflower, Calif., assignor, by mesne assignments, to Houston Fearless Corporation, a corporation of California
Filed Apr. 28, 1959, Ser. No. 809,477
4 Claims. (Cl. 280—30)

The present invention relates to cargo-carrying apparatus, and more particularly to a cargo-carrying structure which is adapted to normally rest upon the ground but to which detachable support means may be readily and conveniently attached for quick transport purposes.

Many and diverse types of cargo storing and transporting apparatus have been known and used heretofore, and may for the most part have been thought to be satisfactory, but their limitations and shortcomings will be readily apparent when viewed in the light of my invention. Suffice it to say that many previous efforts have been made toward devising a single compact, economical apparatus which could be used both for cargo-storage and cargo-transporting purposes, and that my invention accomplishes a further improvement in this general direction.

One object of my invention is to provide a compact, inexpensive cargo-carrying structure which is adapted to normally rest upon the ground, and which may quickly and conveniently be raised off the ground concurrently with the attachment thereto for transport purposes of support means which may with equal ease be detached from the cargo-carrying structure when the destination is reached.

Another object of the invention is to provide wheeled support means adapted for convenient attachment to a cargo-carrying structure, and capable of raising the structure off the ground concurrently with attachment of the support means thereto, or of lowering the structure to the ground concurrently with detachment of the support means therefrom.

A further object of the invention is to provide a wheeled vehicle for transporting cargo, in which the wheels may be quickly and conveniently detached from the main body of the vehicle which is simultaneously lowered to the ground, the same wheels being then quickly attachable to a similar vehicle body for transporting a different cargo.

Before proceeding with the description of an illustrative embodiment of my invention it will be well to briefly outline some of the unique features thereof.

In accordance with the invention the support means, which is to be attached to the cargo-carrying structure for raising and subsequently transporting the load, is provided with one or more elongated support members which extend outward in an approximately horizontal direction. One end of each support member is attached to the support means at a fixed elevation above ground, and rotatable therewith about a horizontal axis, with the result that the other end of the support member adapted for attachment to the cargo-carrying structure may move up and down in a vertical plane. The cargo-carrying structure has a passageway extending from an outer edge thereof substantially horizontally inwardly, the passageway being adapted to receive the support member, which is in turn adapted for insertion into the passageway. The shape of the passageway is such as to cause the end of the support member which is being inserted therein to rotate progressively upwardly relative to the cargo-carrying structure. By forcibly thrusting the support member longitudinally into the passageway, the mid-section of the support member is caused to exert an upward force upon the cargo-carrying structure for raising the corresponding edge thereof to a transporting position.

Selectively operable locking means is also provided, and the support member after being fully inserted into the passageway is therefore locked in place, during the time when the load is being transported. After arrival at destination the support member is unlocked in order to permit detachment of the support means from the cargo-carrying structure.

The support means serves the function of rotatably supporting one end of the support member, or the corresponding ends of a plurality of such members, while the load is being picked up, transported, and dropped off. The support means preferably consists of a wheeled member, or a wheeled vehicle, although other forms thereof may be used without departing from the scope of my invention.

The foregoing objects and purposes of the invention, and the underlying concepts thereof, will be more readily understood from a description of an illustrative embodiment thereof as illustrated in the accompanying drawings, in which:

FIGURE 1 is a perspective view of one form of the invention while carrying a load;

FIGURE 2 is a top plan view of the vehicle of FIGURE 1 in dis-assembled form;

FIGURE 3 is a side elevational view of the vehicle of FIGURE 1 in assembled form;

FIGURE 4 is a partial cross-sectional view of the dis-assembled vehicle taken on the line 4—4 of FIGURE 2; and FIGURE 5 is a partial cross-sectional view of the assembled vehicle taken on the line 5—5 of FIGURE 3.

In FIGURE 1 a towing vehicle A is illustrated pulling a load B, which is in turn carried upon a pallet C to which rear wheels D and front wheels E are attached. Pallet C and wheels D and E together form the vehicle which is illustrated in dis-assembled form in FIGURE 2, and in assembled form in FIGURE 3.

Pallet C includes a flat bed or platform 10 which is supported on a parallel pair of longitudinally extending channel members 11 and 12 which are affixed underneath the outer longitudinal edges of platform 10. The channel members 11, 12 open towards each other, underneath platform 10. Each of the channel members 11, 12 is widened in a vertical direction adjacent its two ends forming a pair of downwardly extending protrusions 13. As all four of the protrusions 13 are identical the same reference numerals will be used throughout to identify the corresponding parts of each. Each of the protrusions 13 is in the form of a downwardly extending V which has the lower point cut off to provide a flat surface for resting upon the ground in order to support pallet C. Channel members 11 and 12 constitute the entire substructure of the bed or platform 10.

More specifically, each protrusion 13 is defined at its upper end by the flat upper side 14 of the channel member, and at its lower boundaries by the flat lower side 15 of the channel member. The portion of side member 15 which inclines downwardly from the outer end of platform 10 is designated as 15a, while the portion which inclines upwardly toward the center of platform 10 is designated as 15b. At the upper end of section 15b the member 15 again runs in a horizontal direction at 15c through the mid-portion of the pallet C. The outer end 14b of member 14, and the upper end of section 15a of member 15, together define an aperture 16 which is adapted to receive a support member in the manner which will be described. Section 15c of member 15 together with section 14a of member 14 define a portion of the channel member which is of standard vertical width, inwardly of pallet C from the corresponding protrusion 13, adapted to retain the end of the support member in load-carrying position.

The rear wheel assembly D includes wheels 20, 21 which are interconnected by an axle 22. A pair of identical support members 23 are disposed in parallel relationship with their ends 23a being pivotally supported from opposite ends of the axle 22, while their other ends 23b are adapted for insertion into the pallet C. Each support member 23 at its end 23b is provided with a roller 24, the two rollers 24 of the assembly being interconnected by a shaft 25 which provides a common axis of rotation. Manually operated locking means 26 are provided on the wheel assembly, for selectively engaging locking lugs 18 provided on the pallet C.

The front wheel assembly E is identical to rear wheel assembly D, except for the additional inclusion of the steering mechanism 27 and towing tongue 28, which are conventional and therefore need not be described in detail.

FIGURE 4 illustrates the manner of attachment of a wheel pair to the pallet C. It will be seen that the upper end of aperture 16, defined by outer end 14b of member 14, is at a lesser elevation than the rotatably supported end 23a of the support member 23. Therefore, support member 23 is inserted into aperture 16 in a downwardly inclined direction. Roller 24 engages the inclined section 15b of member 15. Support member 23 is forcibly thrust in a longitudinal direction through aperture 16 and the passageway provided by protrusion 13, as indicated by an arrow 30 appearing in FIGURE 4. Roller 24 rolls up the inclined surface of side section 15b, with the result that the longitudinal upper edge 23c at the midsection of support member 23 slides under the end 14b of side-section 14 and simultaneously exerts an upward thrust indicated by an arrow 31 thereagainst. A twisting moment is exerted upon pallet C, producing a lifting action upon the corresponding end thereof, until the support member 23 becomes fully inserted so that roller 24 is confined within the standard channel width at 14a, 15c.

In FIGURE 5 it is seen that roller 24 is carried on the outside edge of end 23b of the support member 23, and that shaft 25 is journaled in a suitable bearing 35 which is carried by end 23b of the support member 23. Since support member 23 is channel-shaped and bearing 35 is carried in the bottom wall thereof, the bearing is further supported by a concentric bearing hub 36 positioned within the channel. A circumferential groove is provided on shaft 25, in which a retaining ring 38 is carried for preventing longitudinal displacement of the shaft, and retaining ring 38 rides rotatably against a washer 37 which is disposed adjacent the bearing 35.

While the invention has been illustrated herein in one particular form only, it is to be distinctly understood that there are many alternate forms thereof. For example, either of the support means D and E may utilize only a single wheel, provided that the other has a pair of wheels. Alternatively, the front wheel assembly E may be dispensed with altogether, and the corresponding pair of support members 23 be carried instead on the rear end of the towing vehicle A.

Furthermore, the invention contemplates the possibility that in areas of snow or mud pallet C may be transported upon detachable skis, from which each support member is rotatably supported at one of its ends.

It will be understood that support member 23 need not be of the precise form or shape illustrated, and in fact need not necessarily be a straight member. A considerable degree of strength and rigidity is necessary, however, in order to accomplish the desired lifting action.

In like manner it will be understood that pallet C need not have the precise form shown, but has many different configurations which are within the scope of the invention. Support points at 14b and 15c, and the inclined surface provided by side section 15b, are necessary adjuncts of the approximately horizontal passageway commencing at aperture 16. It is not necessary that the inclined surface proceed in a straight path, for a curved path can be utilized.

In the pallet C the end 14b of side-section 14 of each channel member may be considered as a first load-receiving member. Side-section 15c of the channel member may be considered as a second load-receiving member. The relationship then exists that a passageway extends substantially horizontally inwardly commencing at aperture 16 at one end of the pallet, with the first load-receiving member 14b defining the upper boundary of the end of the passageway. Second load-receiving member 15c defines the lower boundary of the passageway at a point inside the pallet. The channel member also includes side-section or means 15b providing an inclined surface which extends downwardly from second member 15c and at the same time outwardly toward first member 14b.

The critical or essential portions of the pallet C may also be defined in different words as follows: The pallet is a load-carrying structure adapted for underneath support at a first support point 14b, which is adjacent one edge thereof. The pallet also includes rigidly attached means 15b providing an inclined surface whose upper end, at its juncture with the channel side-section 15c, provides a second support point. The inclined surface of 15b extends from said second support point outwardly toward the first support point and at the same time downwardly. The support member or wheel-attachment member 23 is adapted to extend substantially horizontally inwardly of the pallet underneath the first support point, with its outer end 23b being adapted to rest upon the second support point.

The invention also contemplates the possibility that the end aperture 16 may be provided at the same elevation at which the end 23a of the support member 23 is rotatably supported, and that the support member is then initially inserted into the passageway in a horizontal direction, and forced to rotate upwardly to an upwardly inclined position while providing the lifting force.

An interesting feature of the lifting scheme of the invention is that the mechanical advantage of lever arm 23 is a variable. More specifically, the mechanical advantage has its minimum value when the lifting action commences, and thereafter increases to a higher value. Once the lifting action starts, therefore, its successful completion is assured.

Many modifications of the invention will be apparent to those skilled in the art, which nevertheless lie within the novel concept that I have evolved.

What I claim is:

1. Cargo-carrying apparatus comprising, in combination: a cargo-receiving bed having a front end, and a rear end parallel thereto; a parallel pair of channel-shaped members extending from end to end of said cargo-receiving bed in supporting relationship therewith, each of said members having a widened portion at each of its ends providing a downwardly-extending protrusion adapted to rest upon the ground; two parallel pairs of wheel-supported support members adapted for forcible insertion into the corresponding ends of said channel-shaped members, the cooperative action being such that the first-inserted end of each support member engages the upwardly inclined surface at the inward end of the associated widened portion of the corresponding channel-shaped member, for raising the associated end of said bed from the ground as the insertion of the support member proceeds; and means for locking said pairs of support members in longitudinal alignment in their fully-inserted positions within said channel-shaped members.

2. Cargo-carrying apparatus as claimed in claim 1 in which said downwardly-extending protrusions of said channel-shaped members have a flat mid-portion that rests upon the ground, and upwardly sloping ends on both sides thereof.

3. Cargo-carrying apparatus as claimed in claim 1 in which the first-inserted end of each of said support members has a roller thereon.

4. A cargo-carrying structure adapted to normally rest upon the ground, having provided therein a passageway extending from an outer edge of the structure substantially horizontally inwardly thereof, said passageway being adapted to insertably receive an elongated support member in longitudinal alignment therewith, said passageway having a first lower boundary portion at a first distance from said outer edge of said structure and a second lower boundary portion at a second and shorter distance from said outer edge of said structure which is at a lower elevation than said first portion, the upper boundary of said passageway extending substantially horizontally from said outer edge of said structure above said first and second lower boundary portions thus providing two different vertical height portions of said passageway, said passageway also having a third lower boundary portion providing an upwardly inclined surface from said second portion to said first portion, the structural member that provides said second lower boundary portion being adapted to rest directly upon the ground, whereby said elongated support member may be initially inserted into said passageway in a downwardly inclined direction so that its first-inserted end engages said inclined surface, and upon forcing said support member and said structure horizontally towards each other while pivotally supporting the outer end of said support member at a fixed elevation the mid-section of said support member exerts an upward force upon said passageway upper boundary at the outer edge of said structure as the first-inserted end of said support member moves upward on said inclined surface.

References Cited in the file of this patent
UNITED STATES PATENTS

| | | |
|---|---|---|
| 1,744,654 | Lorenzen | Jan. 21, 1930 |
| 1,836,362 | Crowley | Dec. 15, 1931 |
| 2,385,407 | Endress | Sept. 25, 1945 |
| 2,389,211 | Pointer | Nov. 20, 1945 |
| 2,498,504 | Quayle | Feb. 21, 1950 |
| 2,683,611 | Shinn et al. | July 13, 1954 |
| 2,848,252 | Martin | Aug. 19, 1958 |

FOREIGN PATENTS

| | | |
|---|---|---|
| 866,175 | Germany | Feb. 9, 1953 |